UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

1,147,849.  Specification of Letters Patent.  Patented July 27, 1915.

No Drawing.  Application filed February 26, 1907. Serial No. 359,509.

*To all whom it may concern:*

Be it known that I, CARLETON ELLIS, a citizen of the United States, and now residing at Larchmont, in the county of Westchester and State of New York, have made certain new and useful Inventions Relating to Paint or Varnish Removers, of which the following is a specification.

This invention relates to paint or varnish removers and relates especially to removers comprising in addition to solvents of a generally alcoholic or benzolic nature volatile, carbonate decomposing, acid agents which are adapted to attack and decompose ordinary paint pigments, the evolution of gas produced by such decomposition materially aiding in the mechanical disintegration and loosening of the paint film. Such acid agents are preferably readily volatile so as to evaporate from the wood or other surface after acting on the finish or the agents should have such character as not to undesirably affect subsequent coats of finish applied to the surfaces. Such acid agents are, of course, preferably free from any undesirable staining or coloring action on wood surfaces or undue corrosive or poisonous action on the hands of the operator while decomposing carbonate pigments, that is, chemically combining therewith and replacing the carbon dioxid in white lead, for instance.

A number of organic acids of the aliphatic series are desirable for such purposes, such, for instance, as formic, acetic, propionic and butyric acids among the monobasic saturated acids. Lactic acid, preferably used in an approximately anhydrous condition, is an example of a desirable acid agent in the hydroxy group of acids. Ethyl sulfuric acid may also be used having a desirable decomposing or solvent action on lead and barium paint pigments, for example. In the aromatic group various sulfonic acids are desirable, such, for instance, as phenyl sulfonic acid and the related sulfinic acid agents. Benzoic and salicylic acids while solid at ordinary temperatures are noncorrosive acids, sufficiently akin to the various resins so as not to have undesirable action upon them in finish coats subsequently applied to the surface. Other desirable acid agents are hydrochloric and sulfurous acid gas which may be conveniently incorporated in the remover mixture by allowing the desired gas to percolate through a considerable body of the mixture at comparatively low temperature, that is, preferably below 20° C. for sufficient time to effect the absorption of the desired proportion of the acid agent. For most purposes a few per cent. by weight of such gaseous acid agents is sufficient to have the desired action. One or more of such acid agents may be used in removers in connection with suitable loosening finish solvent material, that is, solvent material of a generally alcoholic character or action in removers, such, for example, as methyl, ethyl, amyl and denatured alcohol, acetone, methyl acetone, methyl ethyl ketone, oil of acetone, pinacoline, light oil of hard wood tar, butyrone and allied solvents. Penetrating finish solvent material may also be used, that is, solvent material of a generally benzolic character or action in removers, such as benzol, toluol, xylol, cumene, benzin and various other petroleum hydrocarbons, carbon-bisulfid, carbon tetrachlorid and other chlorinated hydrocarbons, such as chlor benzol, also methyl, ethyl, amyl and other ethers, and methyl, ethyl and amyl acetates and other esteric compounds.

Although not necessary in all cases, various stiffening material may be used, such as wood flour, starch, whiting, infusorial earth and also film-forming material of this character, such as soapy or waxy bodies, nitro cellulose and other solid organic bodies having the property of forming an evaporation retarding film over the surface of the remover when in use. All the ingredients are preferably thoroughly incorporated by agitation, the soapy, waxy or other film-forming stiffening material being preferably first dissolved in the more energetic solvents, although this is not always necessary.

An illustrative remover of this character may comprise methyl acetone 30 parts, benzol 25 parts, glacial acetic acid 4 parts, ceresin wax 1 part.

Another illustrative remover may comprise denatured alcohol 45 parts, oil of acetone 15 parts, benzin 5 parts, with which ½ part of ceresin or paraffin wax may be incorporated, and then the mixture impregnated with a few per cent. of hydrochloric acid gas.

Illustrative removers suitable for dipping or tank work may comprise amyl alcohol 15 parts, light kerosene 10 parts, pinacolin 20 parts and formic acid 5 parts, or according to another formula, denatured alcohol 40 parts, methylethyl ketone 25 parts, glacial acetic acid 6 parts and ceresin wax ¼ part, although the stiffening material may, of course, be omitted when desired.

Having described this invention in connection with a number of illustrative ingredients and formulas, to the details of which disclosure it is not, of course, to be limited, what is claimed as new and what is desired to be secured by Letters Patent is set forth in the appended claims.

I claim—

1. The paint or varnish remover comprising approximately methyl acetone 30 parts, benzol 25 parts, glacial acetic acid 4 parts and wax 1 part.

2. The paint or varnish remover comprising approximately methyl acetone 30 parts, benzol 25 parts, glacial acetic acid 4 parts and waxy stiffening material.

3. The paint or varnish remover comprising approximately methyl acetone 30 parts, benzol 25 parts, a volatile carbonate decomposing organic acid 4 parts and stiffening material.

4. The paint or varnish remover comprising substantially equal parts of penetrating solvent material and methyl acetone with which a small proportion of volatile carbonate decomposing organic acid and waxy stiffening material have been incorporated.

5. The paint or varnish remover comprising substantially equal parts of penetrating solvent material, methyl acetone and a small proportion of incorporated substantially volatile carbonate decomposing material.

6. The paint or varnish remover comprising approximately methyl acetone 30 parts, benzol 25 parts, and glacial acetic acid 4 parts.

7. The paint or varnish remover comprising approximately methyl acetone 30 parts, benzol 25 parts, and a volatile carbonate decomposing acid 4 parts.

8. The paint or varnish remover comprising composite volatile finish softening material, including methyl acetone and a small proportion of incorporated glacial acetic acid capable of decomposing carbonate paint pigments.

CARLETON ELLIS.

Witnesses:
HARRY L. DUNCAN,
JESSIE B. KAY.